Nov. 30, 1937.  A. N. SPÁNEL  2,100,576
FORM FOR MAKING RUBBER ARTICLES
Filed Dec. 23, 1935   6 Sheets-Sheet 4

INVENTOR.
Abraham N. Spánel
BY D. Clyde Jones
his ATTORNEY.

Nov. 30, 1937. A. N. SPÁNEL 2,100,576
FORM FOR MAKING RUBBER ARTICLES
Filed Dec. 23, 1935 6 Sheets-Sheet 5

INVENTOR.
Abraham N. Spánel
BY D. Clyde Jones
his ATTORNEY.

Patented Nov. 30, 1937

2,100,576

UNITED STATES PATENT OFFICE 2,100,576

FORM FOR MAKING RUBBER ARTICLES

Abraham N. Spánel, Rochester, N. Y.

Application December 23, 1935, Serial No. 55,771

12 Claims. (Cl. 18—41)

This invention relates to forms for making hollow deposited rubber articles.

In the past forms for making hollow rubber articles have been cast from porcelain, glass or like materials. However, the casting and finishing of such forms has been expensive and where a large number of forms were necessary as in the case of quantity production of rubber articles, a large investment in patterns, dies and forms has been required. Furthermore, large forms such as are required in the making of rubber capes and other large rubber articles have embraced or constituted large volume mass, so that when a large number of these forms were dipped simultaneously there was a great displacement of the latex, requiring an unwieldy and large receptacle for the latex bath and requiring a costly, large amount of latex in the bath.

In accordance with the present invention, a substantial portion of each form is made of sheet material so that its volume is greatly reduced while at certain of the margins of the plate there are provided sealed hollow borders which serve to give depth to the article.

The main feature of the invention relates to a form made of sheet material and having attached to a portion of its margin, a hollow border.

Another feature of the invention relates to a form made of sheet material having its margin formed to provide a hollow border integral with the body of the form.

Still another feature of the invention relates to a form made from two sheets of material, having their margins formed to provide a hollow border.

These and other features of the invention will appear from the detailed description and claims.

For a clearer understanding of the invention, reference is made to the drawings in which Figs. 1 to 12 inclusive are cross sectional views of the plates and borders of various forms on which hollow rubber articles can be deposited.

Fig. 43 is also an enlarged vertical section similar to that illustrated in Fig. 41 but showing a modified construction for the border of the form.

Generally, the invention relates to a form comprising a plate 5 of sheet material, such as aluminum or stainless steel, cut to approximately the desired outline of the form and a tubular border such as 6 and 20 (Figs. 1 to 12) also of tubular sheet material attached to a certain portion of the margin of the plate. As illustrated in Figs. 1 to 6, the tubular border 6 is circular in cross section.

Figure 1:
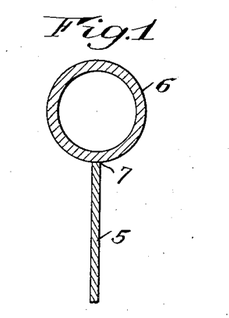
Figure 2:
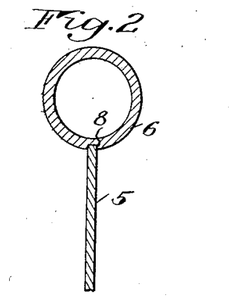

In Fig. 1 the edge of the plate 5 is welded and/or soldered directly to the border 6 as indicated at 7, while in the arrangement of Fig. 2, the tubular border 6 has a notch or kerf 8 cut lengthwise therein, of a width just sufficient to receive the edge of plate 5, which edge is retained in the kerf or notch by means of welding and/or soldering.

Figure 3:
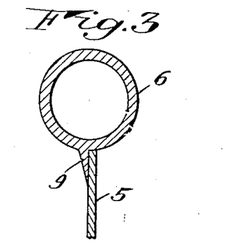

In the further modified arrangement of Fig. 3, the tubular border 6 is provided with a fin 9 projecting therefrom, to one face of which, the margin of the plate 5 is attached as by welding and/or soldering with the edge of the plate abutting against the tubular border.

Figure 4:
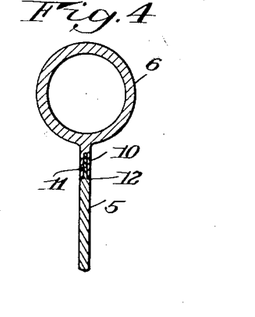

As shown in Fig. 4, the border 6 is provided with a rib 10 having a slot or kerf 11 provided therein. The edge of the plate 5 is formed with a tongue 12 which is received in this slot, the rib 10 being welded or otherwise attached to the tongue 12, the seams between the plate and the rib being filled with solder.

Figure 5:
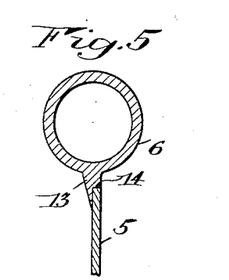

In the construction shown in Fig. 5, the border 6 is provided with a fin 13 similar to the fin 9 of Fig. 3. Fin 13, however, is notched, as indicated at 14, to receive the edge of the plate 5, the parts being welded and/or soldered together in the position shown.

Figure 6:
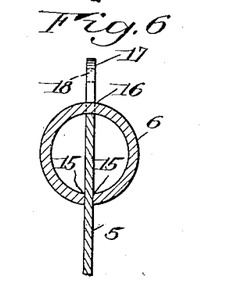

In the arrangement shown in Fig. 6, the border 6 is formed with a slot therein, as indicated at 15, to receive the margin of the plate 5. This border is also provided at its opposite side with an opening 16 through which a projection 17 on the edge of the plate extends. This projection may have an opening 18 therein by which the form can be suspended. It will be understood that the plate 5 may be welded or otherwise joined to the edge of the border at the slot 15 therein, the junction between the form and the border being filled with solder or like material.

In the foregoing forms the border has been illustrated as being generally circular in cross section, but it will be understood, that the border may have other shapes. For example, in Figs. 7 to 12 inclusive, the border is generally oval in cross section.

Figure 7:
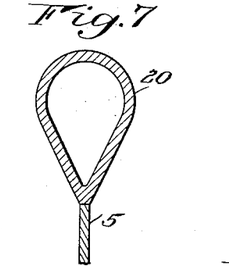

As shown in Fig. 7, the pointed or reduced portion of the oval border 20 is welded or otherwise fastened to the edge of the plate 5.

Figure 8:
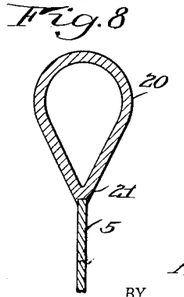

In the arrangement shown in Fig. 8, the border 20 has its pointed or reduced portion notched as indicated at 21 to receive the edge of the plate 5, the two parts being welded and/or soldered together at this point.

Figure 9:
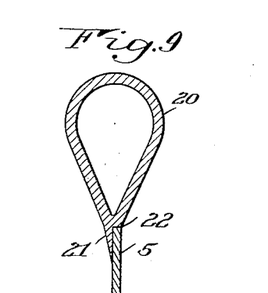

In the construction of Fig. 9, the border 20 at its reduced portion, is provided with a fin 21 against which one face of the plate 5 engages, the edge of the plate engaging the recessed part 22 of the border so that the plate and border can be joined together by welding and/or soldering without any seams or abrupt edges.

Figure 10:
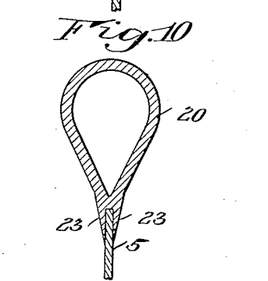

In the arrangement shown in Fig. 10, the reduced end of the border 20 has two fins 23 spaced just sufficient to receive the margin of the plate 5. The plate is welded or otherwise fastened in the position shown between the fins and the seams between the two parts are filled with solder.

Figure 11:
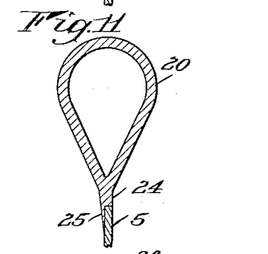

In the construction shown in Fig. 11, the reduced portion of the border is provided with a rib 24 which in turn is provided at one edge with a fin 25. One surface of the margin of the plate 5 engages the fin 25, the edge of the plate engaging the end of the rib 24. The parts are welded or otherwise fastened together in the position shown, all seams being filled with solder or other material so that the plate and the border provide an uninterrupted smooth surface.

Figure 12:
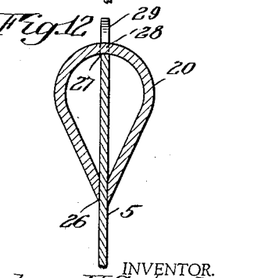
Figures 13, 14:
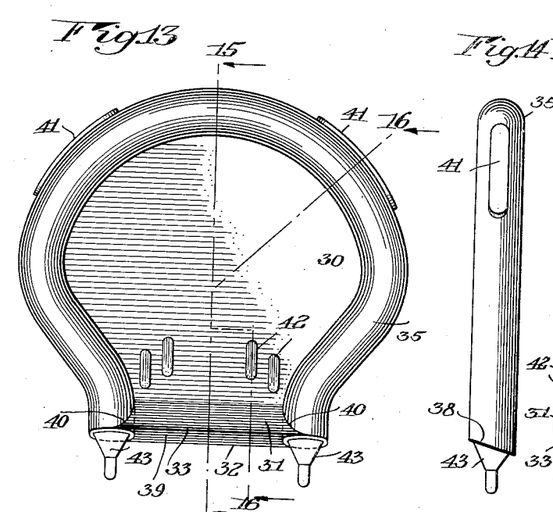
Figs. 13 and 14 are respectively a front view and a side view of a form constructed in accordance with the present invention and adapted for use in making baby pants.

In the arrangement shown in Fig. 12, the border 20 at its reduced end, is provided with a slot 26 of a width to receive the plate 5. The edge 27 of the plate engages the inner surface of the border while the border is provided with an opening 28 therein through which a projection 29 on the plate extends. The parts may be welded or otherwise joined together in the position shown and the seams between the plate and the border at the openings 26 and 28 are soldered or otherwise filled with material.

In Figs. 13 to 16 inclusive the invention is incorporated in a form for making rubber baby pants. This form comprises a flat plate 30, terminating at its lower portion in a straight border 31 shaped to have a generally triangular cross section. It will be noted that the apex 32 of this border is lower than the apex 33 thereof, so that at the top opening of the deposited garment, the front portion thereof is shorter than the back portion of the same whereby these garment portions are offset in the finished article. The straight border is made preferably by bending the lower margin of the plate 30 to have a triangular cross section with the edge 34 of the plate welded and/or soldered to the main part thereof to fill in the seam therebetween. The remainder of the curved margin of the plate 30 has attached thereto a curved tubular border 35, this border being provided with a notch 36, best indicated in Fig. 16, to receive the edge of the plate, the junction 37 between the border and the plate being filled with solder to present a rounded surface. The ends of the curved border 35 are cut on the bias as indicated at 38 Fig. 14, so that they are in alinement with the face 39 of the triangular border 31. It will be noted (Fig. 13) that the ends of the triangular border are curved as indicated at 40 to snugly engage the end portions of the curved border. Spaced portions of the upper surface of this border have attached thereto flattened elliptical plates 41 which constitute bosses to generate leg openings in the resulting garment. The front face of the plate 30 near the portion thereof which generates the top opening in the pants, has fastened thereon, spaced pairs of bosses 42 which are preferably plates of flattened elliptical outline soldered or otherwise fastened to the face of the plate without any seam between these parts. Supporting pins 43 inserted in the open end of the tubular border 35 and filling the same, serve to support the form on any suitable dipping rack (not shown). It will be appreciated that the border 35 instead of having the cross section disclosed in Fig. 2, may have a cross section similar to any one of those illustrated in the remaining Figs. 1 to 12.

Figures 15, 16, 19:
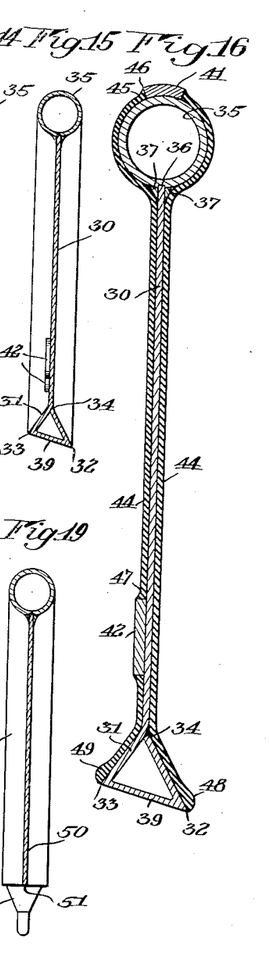
Fig. 15 is a vertical section of this form taken substantially on the line 15—15 of Fig. 13.
Fig. 16 is an enlarged cross sectional view of this form taken substantially on the line 16—16 of Fig. 13, also illustrating the character of the rubber layer deposited thereon.
Fig. 19 is a vertical section of this form taken substantially on the line 19—19 of Fig. 17 showing specifically the type of border generally illustrated in Fig. 2.
Figures 17, 18:
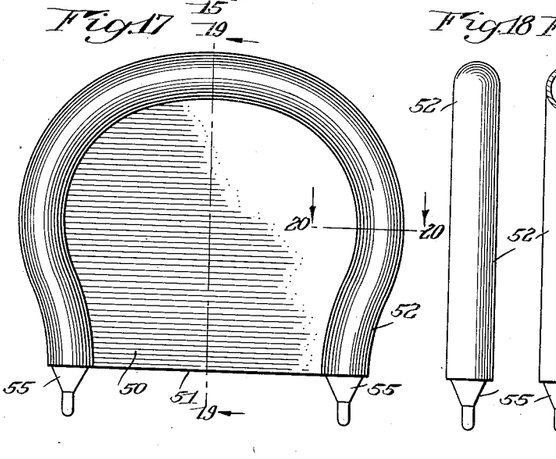
Fig. 17 is a front view and Fig. 18 is a side view of a form on which bathing caps can be deposited.

By reference to Fig. 16 the character of the rubber garment deposited on this form will be understood. On the surfaces of the plate 30 and on the exposed surface of the border 35, a rubber layer will be deposited. However, at the junction between the bosses 41 and the border 35 the rubber layer will accumulate to have an increased thickness, as indicated at 45, while at the abrupt edge 46 of each boss, the deposited layer will have a line of weakness therein so that the portions of the rubber layer on the exposed face of each of the bosses can be torn or cut away. Similarly, in the junction between each of the bosses 42 and the plate 30 the rubber layer will accumulate as indicated at 47, while at the abrupt edge of each boss a line of weakness will be developed in the layer so that the rubber on the face of each of these bosses can be stripped away to provide ventilating openings with reinforced margins in the resulting garment. Adjacent the abrupt lower edges 32 and 33 of the form, the rubber will accumulate as indicated at 48 and 49 to provide reinforcements which are generally semi-pear-shaped or semi-oval in cross section. However, at the abrupt edges 32 and 33 a line of weakness will develop in the deposited layer so that the rubber on the face 39 of the lower border, can be stripped away to provide a top opening in the resulting garment. When the garment has been properly "set", dried or cured, the form may be removed through the top opening and an article substantially trimmed will result.

In Figs. 17 to 20 inclusive there is illustrated a modified type of form on which bathing caps or the like can be deposited. This form comprises a plate 50 having a straight abrupt lower edge 51 while the remainder of this plate is cut to a generally curved outline. A tubular border 52 (Fig. 20) conforming to the curved outline of the plate has cut into its inner exposed surface, a notch 53 which receives the curved edge of the plate 50. The engaging portions of the plate and border are joined together and the junction between the edge of the plate 52 and the border 53 is filled with solder 54 or the like. Pins 55 filling and sealing the open ends of the border 52, serve as supports by which the form can be mounted on a rack or the like.

Figure 20:
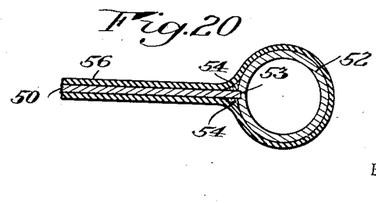
Fig. 20 is a cross sectional view of this form taken on the line 20—20 of Fig. 17, showing a layer of deposited rubber thereon.

In Fig. 20 a portion of the plate 50 and its border 52 having a deposited layer of rubber 56 thereon, are illustrated. It will be understood that adjacent the abrupt edge 51 of the form, ridges of rubber, not shown, but similar in cross section to the ridges illustrated at 48 and 49 in Fig. 16 are deposited. At the corners of the abrupt edge 51, lines of weakness develop in the deposited layer 56 so that the layer is readily parted along these lines to provide the head opening in the resulting cap.

Figures 21, 22, 23, 24, 25, 26, 27:
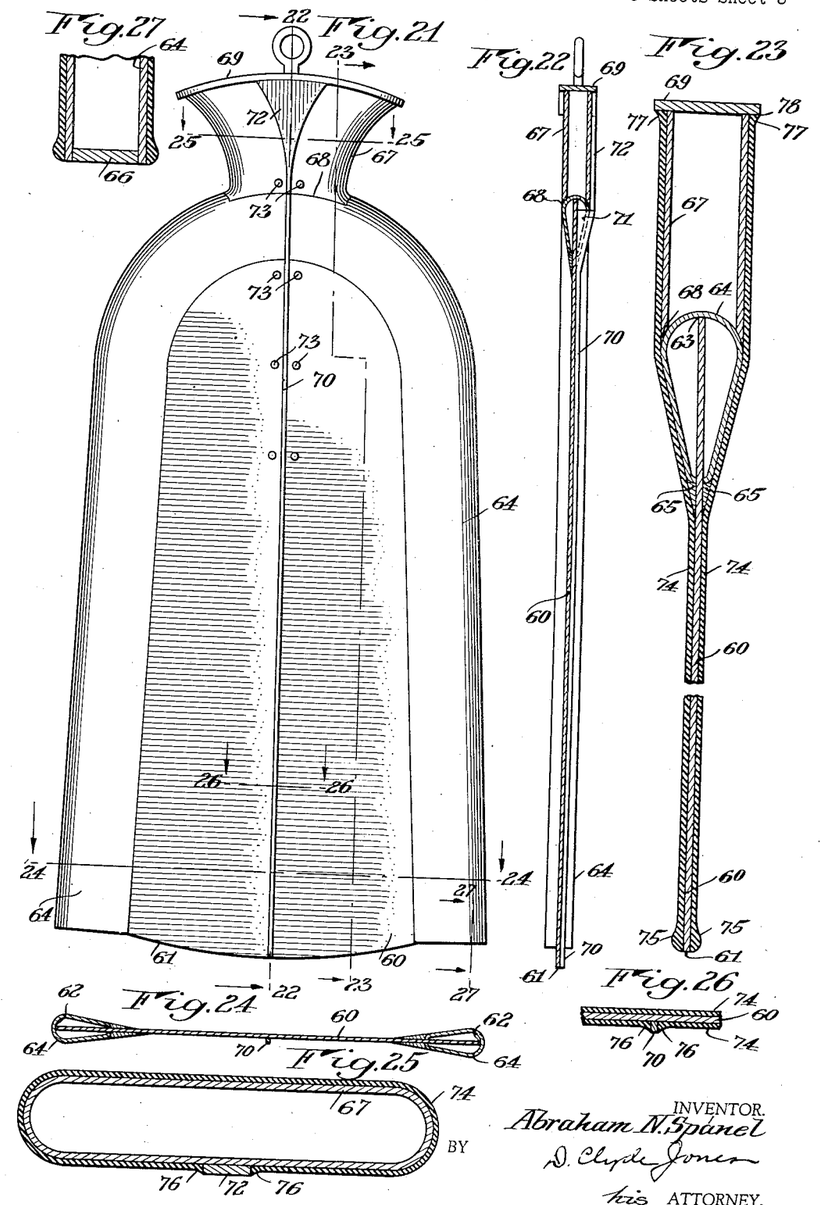
Fig. 21 illustrates a form made in accordance with the present invention on which a rubber cape can be deposited.
Fig. 22 is a vertical section of this form taken substantially on the line 22—22 of Fig. 21.
Fig. 23 is an enlarged fragmentary vertical section taken substantially on the line 23—23 of Fig. 21 and also indicating thereon the character of the rubber layer deposited on this portion of the form.
Fig. 24 is a cross sectional view taken substantially on the line 24—24 of Fig. 21.
Fig. 25 is an enlarged cross sectional view of the neck portion of the form taken substantially on the line 25—25 in Fig. 21 and indicating the character of the rubber layer deposited on this portion of the form.
Fig. 26 is an enlarged fragmentary cross sectional view taken substantially on the line 26—26 of Fig. 21, showing the character of the rubber layer deposited on this portion of the form.
Fig. 27 is an enlarged fragmentary sectional view taken substantially on the line 27—27 of Fig. 21, showing the character of the border of the form, and the marginal reinforcement at the lower portion of the deposited cape.

In Figs. 21 to 27 inclusive, there is illustrated a form made in accordance with the present invention on which a rubber cape can be deposited. This form comprises a plate 60 having a downwardly curved lower edge 61. The side edges 62 of the plate are straight and slope upwardly toward the curved top edge 63 thereof Fig. 23. The side edges and the curved top of the plate are inserted into a slot in a hollow border 64 which is bent or bowed to conform to the outline of these last-mentioned edges of the plate. As herein illustrated, the margin of the plate 60 is inserted through the slot in the border with the edges 62 and 63 thereof engaging the inner surface of the border, after the manner illustrated in Fig. 23. The junctions between the border and the plate are filled with solder 65 or other material so that the surface of the border merges without seams into the surfaces of the plate. The lower ends of the hollow border are preferably sealed by plates 66 (Fig. 27).

The portion of the form which develops the neck of the cape comprises a flattened tubular portion 67 which flares upwardly. The lower edges 68 of this portion are beveled (Fig. 23) to engage and to merge into the curved surface of the border, the neck portion and the border being welded and/or soldered together so that the junction between the two will be without seams. The upper end of the neck portion 67 is closed by a curved plate 69 of flattened elliptical outline, which is joined to the upper edges of the neck portion and which projects slightly beyond this portion. On the front surface of the plate 60 and extending along its principal axis, there is attached a rib 70 having a depth substantially equal to the thickness of the desired reinforcement at the edge of the front opening in the resulting cape. The upper triangular part 71 (Fig. 22) of the rib 70 is preferably set into a notch in the border 64 so that this part projects from the surface of the border, substantially equal to the projection of the rib from the plate. On the front of the neck portion 67, there is attached an angular or gusset shaped piece 72 which extends from the under surface of the curved plate 69 to the upper end of the part 71 of the rib 70 making a flush junction therewith. Near the upper portion of the form, pairs of bosses 73 are provided, the bosses of each pair being separated by the rib 70.

Figure 32:
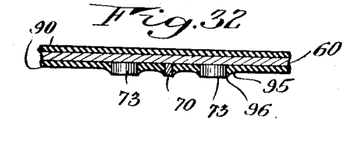
Fig. 32 is an enlarged fragmentary cross sectional view taken substantially on the line 32—32 of Fig. 28, illustrating the character of the layer and the reinforcement of the margins thereof at this portion of the form.

By reference especially to Figs. 23, 25 and 26, the character of the rubber layer 74 deposited on the several surfaces of the form during dipping, can be ascertained. On the plate, the curved border, and the neck portion of the form, a layer of latex rubber will be deposited. Adjacent the lower edge 61 of the form, the layer will accumulate as a reinforcement 75 which is generally semi-pear-shaped or semi-oval in cross section. At the abrupt corners of the lower edge of the plate a line of weakness will develop in the rubber layer so that a strip of rubber on the edge of the form can be readily torn away leaving the lower end of the cape open. In the junctions between the rib and the angular piece 72 with the plate 60 and the neck portion 67, the rubber will accumulate as a reinforcement 76. It will be understood that on the front face of the rib 70 and the piece 72, the rubber layer can be cut or torn away, providing the front opening in the cape and leaving the reinforcements 76 with torn or cut edges. Similarly, at the junction between the top plate 69 and the neck portion 67, a reinforcing ridge 77 (Fig. 23) will be developed. The rubber layer (not shown) on the top of the plate 69 and on the edge thereof being torn away to leave a feather edge 78 on the reinforcement 77. The bosses 73 develop openings with reinforced margins in the cape similar to those shown in Fig. 32 when the rubber layer at the face of each boss is stripped away as far as the abrupt edge of the boss.

Figure 28:
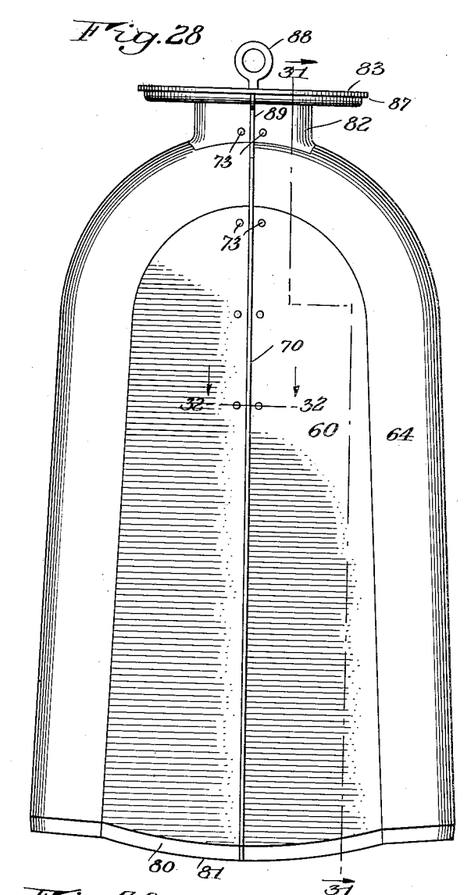
Fig. 28 is a front elevation of a modified form on which a somewhat different style of cape can be deposited.
Figure 29:
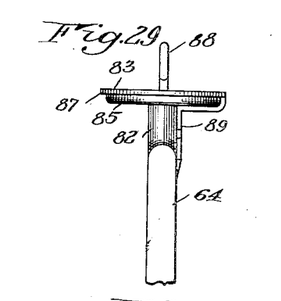
Fig. 29 is a fragmentary side elevation thereof showing the upper portion of this form.
Figure 30:
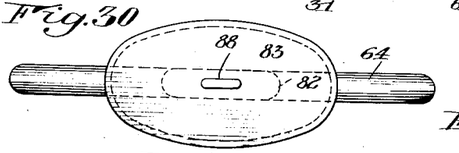
Fig. 30 is a plan view of this form.

The modified cape-generating form illustrated in Figs. 28 to 32 inclusive is similar to the form just described with differences which will now be set forth. The lower margin of the plate 60 is beveled as indicated at 80 and terminates in a knife edge 81. The neck portion, now designated 82 does not flare outwardly, but instead extends vertically and its upper edge engages the under surface of an elliptical plate 83. This plate is provided on its lower surface with a boss 84 which is inserted in the open end of and is secured to the neck portion 82, being welded or otherwise fastened thereto. The under surface of the plate 83 is flat as indicated at 85 but curves upwardly to a recess 86 adjacent to an abrupt edge 87 of the plate. This plate is provided on its upper surface with a ring 88 by which the form can be supported. The upper end of the rib 70 engages the lower end of an angular rib extension 89 which is shaped to conform to and is attached to the front of the neck portion 82 and to the underside of the top plate 83. It will be noted that the upper end of the extension 89 has its exposed edge flush with the corner 87 of the top plate (Fig. 29).

The rubber cape 90 deposited on this form is similar to that just referred to and need not be further described except to state that the lower margin adjacent to the sharp edge 81 of the form is reinforced by a ridge of rubber 91 which is semi-pear-shaped or semi-oval in cross section, these reinforcements being readily separable at this sharp edge of the form. The neck portion of the cape is provided with a collar 92 having a reinforced margin 93 which terminates in a feather edge 94. It will be understood that the front opening in the cape is formed by tearing away the rubber layer from the face of the rib 70 and rib extension 89 while the upper edge of the collar 92 is formed by tearing away the excess layer of rubber on top of the plate 83 as far as the abrupt corner 87 to provide the feather edge 94 on the collar of the finished cape.

At the junction of each boss 73 with the plate 60, the rubber accumulates as indicated at 95 (Fig. 32) while at the abrupt edge of the boss a line of weakness will develop on the deposited layer. The rubber (not shown) on the faces of the boss is therefore easily stripped away as far as the mentioned line of weakness leaving the reinforcement 95 with a feather or torn edge 96. It should be noted that the collar has a thickened region 97 to give it body.

Figures 31, 33, 33A:
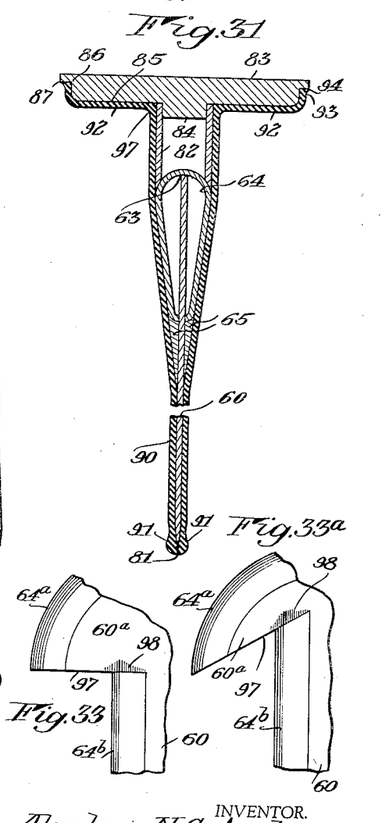
Fig. 31 is an enlarged fragmentary vertical sectional view of this form, taken substantially on the line 31—31 of Fig. 28, illustrating the character of rubber layer deposited on this portion of the form.
Fig. 33 is a fragmentary view illustrating how the form of Fig. 28 can be modified to generate a cape having sleeves thereon.
Fig. 33a is a similar fragmentary view of a form on which a cape with half-closing sleeve openings can be made.

The form of Fig. 28 can be modified, as indicated in the fragmentary view of Fig. 33, to generate rubber capes which are provided with sleeves. In this modified construction, the plate 60 is provided at each side edge and near the top thereof with an extension 60a. These extensions constitute overhanging portions each of which terminates in a sharp or abrupt edge 97. The top and side margins of the plate of this form are provided with a hollow border but at the edge 97 the border is interrupted. Thus there are two border portions 64a and 64b on each half of the plate, the ends of which border portions are separated from each other a distance equal to the desired width of the sleeve. The lower end of the border 64a is closed and sealed in any convenient manner, while the upper end of the border 64b is closed by welded material and/or solder 98 which merges, without seams, with the plate 60. The form of Fig. 33 can be changed as indicated in Fig. 33a, so that a cape deposited thereon will leave self-closing sleeve openings therein. The form of Fig. 33a differs from the form of Fig. 33 in that the edge 97 of the extension 60a as well as the adjacent ends of the borders 64a and 64b, terminate in a plane which extends upwardly toward the main axis of the form.

The cape-generating form illustrated in Figs. 34 to 39 inclusive is similar to the form illustrated in Fig. 28, except that the upper edge of the neck portion 82 is cut off at an oblique angle and an elliptical plate 100 is fastened on the inclined edge of the neck portion. This plate is provided with a downward extending flange 101 which terminates in the abrupt edge 102. The plate 100 is inclined so that when the form is dipped into an aqueous dispersion of rubber, air will not be trapped within the flange 101. Also, in this arrangement, the rib extension 103 engages a portion of the front face of the hollow border 64 as well as the front face of the neck portion 82 and then is inclined downwardly in engagement with the undersurface of the plate where it terminates against the inner surface of the flange 101. The rib 70 and the extension 103 are welded or soldered to the several parts with which they are in engagement.

Figures 34, 35, 36, 37, 38, 39:
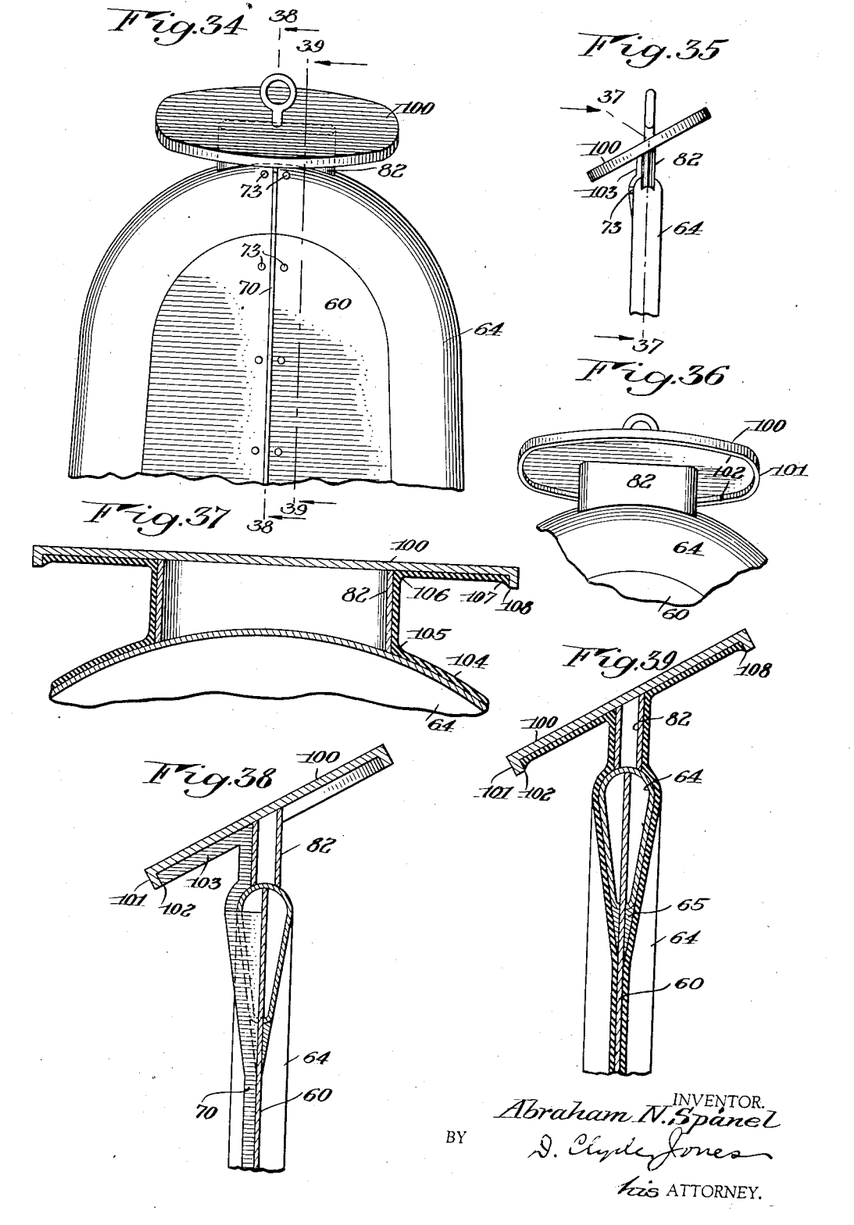
Fig. 34 is a fragmentary front elevation of a still further modified type of form on which a different style of cape can be deposited.
Fig. 35 is a side view and Fig. 36 is a fragmentary rear view of the upper portion of this form.
Fig. 37 is an enlarged vertical section of the upper portion of the form taken substantially on the line 37—37 of Fig. 35.
Fig. 38 is an enlarged vertical section taken substantially on the line 38—38 of Fig. 34.
Fig. 39 is an enlarged fragmentary vertical section taken substantially on the line 39—39 of Fig. 34, also indicating the character of the layer deposited on this portion of the form.

In Figs. 37 and 39, an enlarged fragment of a cape 104 is illustrated. It is unnecessary to describe this cape since it is identical with those already decribed except for the collar thereof. It should be pointed out that the collar of the cape is strengthened by thickened regions 105 and 106 therein. The margin of the collar of the cape is reinforced as indicated at 107 and terminates in a torn or cut edge 108.

Figures 40, 41:
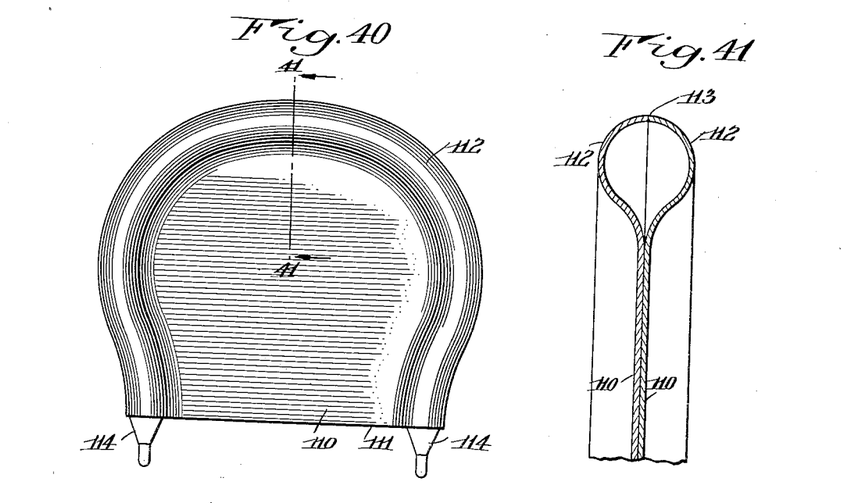
Fig. 40 is a front view of a form for making rubber bathing caps and the like, said form having a somewhat modified type of border.
Fig. 41 is an enlarged fragmentary vertical section of this form taken substantially on the line 41—41 of Fig. 40.

In the modified arrangement shown in Figs. 40 and 41 the invention has been incorporated in a form for making rubber bathing caps. In this form two plates 110 of the general outline of the desired cap, terminate at their lower portion in registering abrupt edges 111. The remainder of the margin of each plate is bowed outwardly and then inwardly as indicated at 112, with their edges brought together at 113 where these edges are welded or otherwise attached together. It will be understood that the seam 113 at the bowed edges of the plates should be ground or finished so that the exposed surfaces of the resultant hollow border is free from any cracks or crevices. Tapered plugs 114 may be inserted in and completely fill the openings in the border where they are fastened, these plugs serving to support the form on a suitable dipping rack (not shown).

Figure 42:
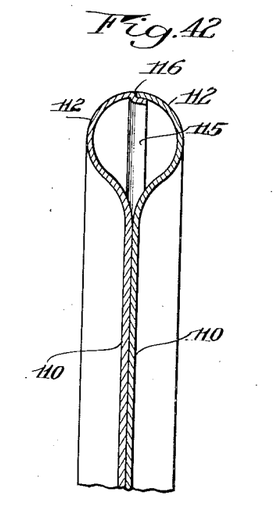
Fig. 42 is an enlarged vertical section similar to that illustrated in Fig. 41 but showing a modified construction for the border of the form.

In the modified type of form shown in Fig. 42, one of the bowed portions 112 of the border is provided with an offset flange 115 on which the edge of the other bowed portion 112 telescopes, the seam 116 between the two bowed portions being welded and/or filled with solder or otherwise closed so that this portion of the form is free from any crack or seam.

Figure 43:
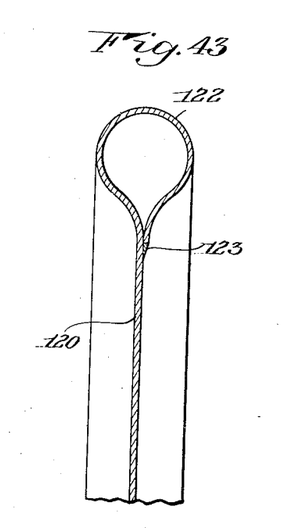
Fig. 43 is also an enlarged vertical section similar to that illustrated in Fig. 41 but showing still a different modified border for the form.

In the further modified type of this form disclosed in Fig. 43, a single plate 120 has its margin bowed outwardly and then inwardly on itself to provide a hollow border 122 generally circular in cross section. The edge of this plate is attached to itself as indicated at 123 by soldering and/or welding.

What I claim is:

1. A form for making deposited rubber pants comprising a plate having a lower margin and a curved margin joining said lower margin, said lower margin being formed into a border of generally triangular cross section and a rounded border of sheet material connected to the curved margin of said plate and having both of its ends terminating at said triangular border, said rounded border being substantially thicker than said plate.

2. A form for making deposited rubber capes and the like which comprises a plate having a lower edge, the side edges of said plate being generally straight and merging into a curved top edge, with a rounded border at the top edge of said plate and extending beyond said plate, said rounded border being thicker than said plate.

3. A form for making deposited rubber capes and the like which comprises a plate having a curved lower edge, the side edges of said plate being generally straight and merging into a curved top edge, and a rounded border of sheet material attached to the top and side margins of said plate, said rounded border being thicker than said plate.

4. A form for making deposited rubber capes and the like which comprises a plate having a lower edge, the side edges of said plate being generally straight and merging into a curved top edge, a rounded border of sheet material at the top margin of said plate, and a neck-generating portion of curved cross-section merging with said rounded border, said rounded border being thicker than said plate.

5. A form for making deposited rubber capes and the like which comprises a plate having a curved lower edge, the side edges of said plate being generally straight and merging into a curved top edge, a rounded border of sheet material attached to the top and side margins of said plate and a neck-generating portion of curved cross section connected to and merging with said rounded border, said border being thicker than said plate.

6. A form for making deposited rubber capes and the like which comprises a plate having a lower edge, the side edges of said plate being generally straight and merging into a curved top edge, a rounded border of sheet material at the top and side margins of said plate and extending beyond said plate, said border being thicker than said plate, a neck-generating portion of curved cross-section connected to and merging with said rounded border and a collar-generating plate connected to the upper end of said neck-generating portion.

7. A form for making deposited rubber articles which comprises a relatively thin plate and a rounded border on a substantial portion of the margin of said plate, said border being substantially thicker than said plate.

8. A form for making deposited rubber articles which comprises a plate of sheet material, said plate having a thin edge at its lower margin and a border at another portion of the margin of said plate, said border being thicker than said plate and being rounded in cross section.

9. A form for making deposited rubber articles which comprises a plate made of sheet material and a tubular border connected to a substantial portion of the margin of said plate, said border being substantially thicker than said plate.

10. A form for making deposited rubber articles, which comprises a plate made of sheet material, and a hollow rounded border on a substantial portion of the margin of said plate, said border being sealed and substantially thicker than said plate.

11. A form for making rubber caps and the like which comprises a plate made of sheet material having an outline generally similar to the outline of the desired cap, said plate having a lower margin and the remainder of the margin being curved and a rounded border connected to the curved margin of said plate, said border being substantially thicker than said plate.

12. A form for making deposited rubber articles which comprises a plate having a lower margin, the ends of said margin being connected by a curved margin, a rounded border connected to the curved margin of said plate, and bosses spaced apart on said border at points removed from the ends of the rounded border, said border being substantially thicker than said plate.

ABRAHAM N. SPÁNEL.